Aug. 24, 1943.           C. C. FUERST           2,327,780
                         CAMERA SHUTTER
                      Filed Sept. 6, 1941        2 Sheets-Sheet 2
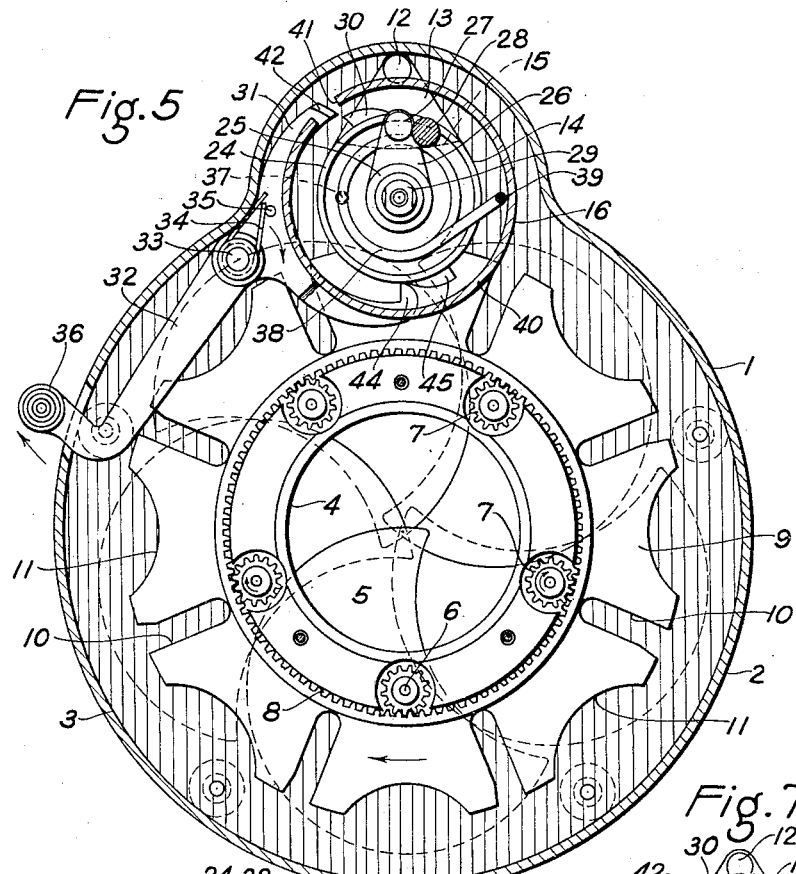
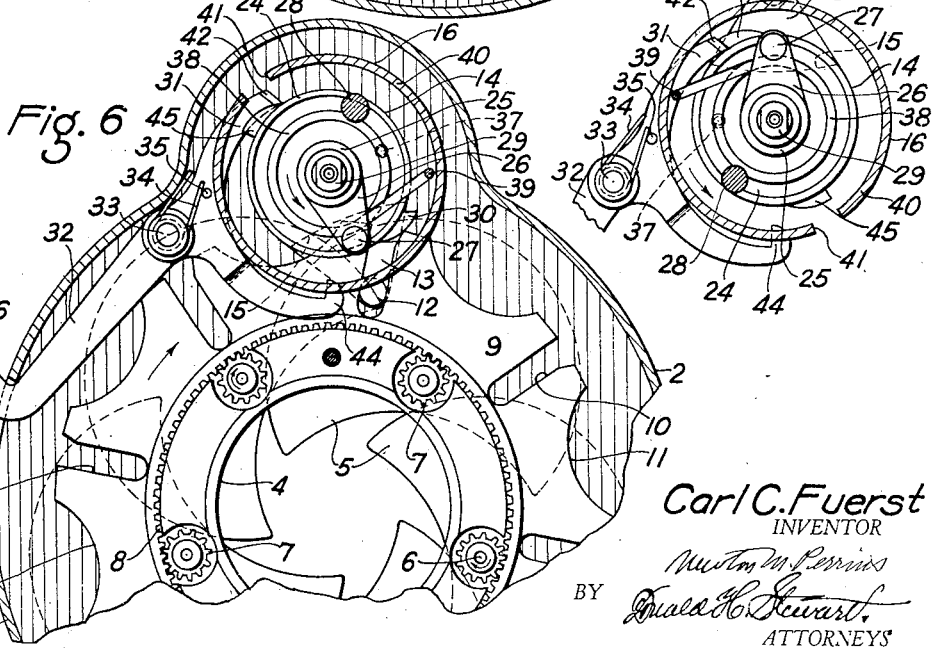
Carl C. Fuerst
INVENTOR
BY
ATTORNEYS Patented Aug. 24, 1943

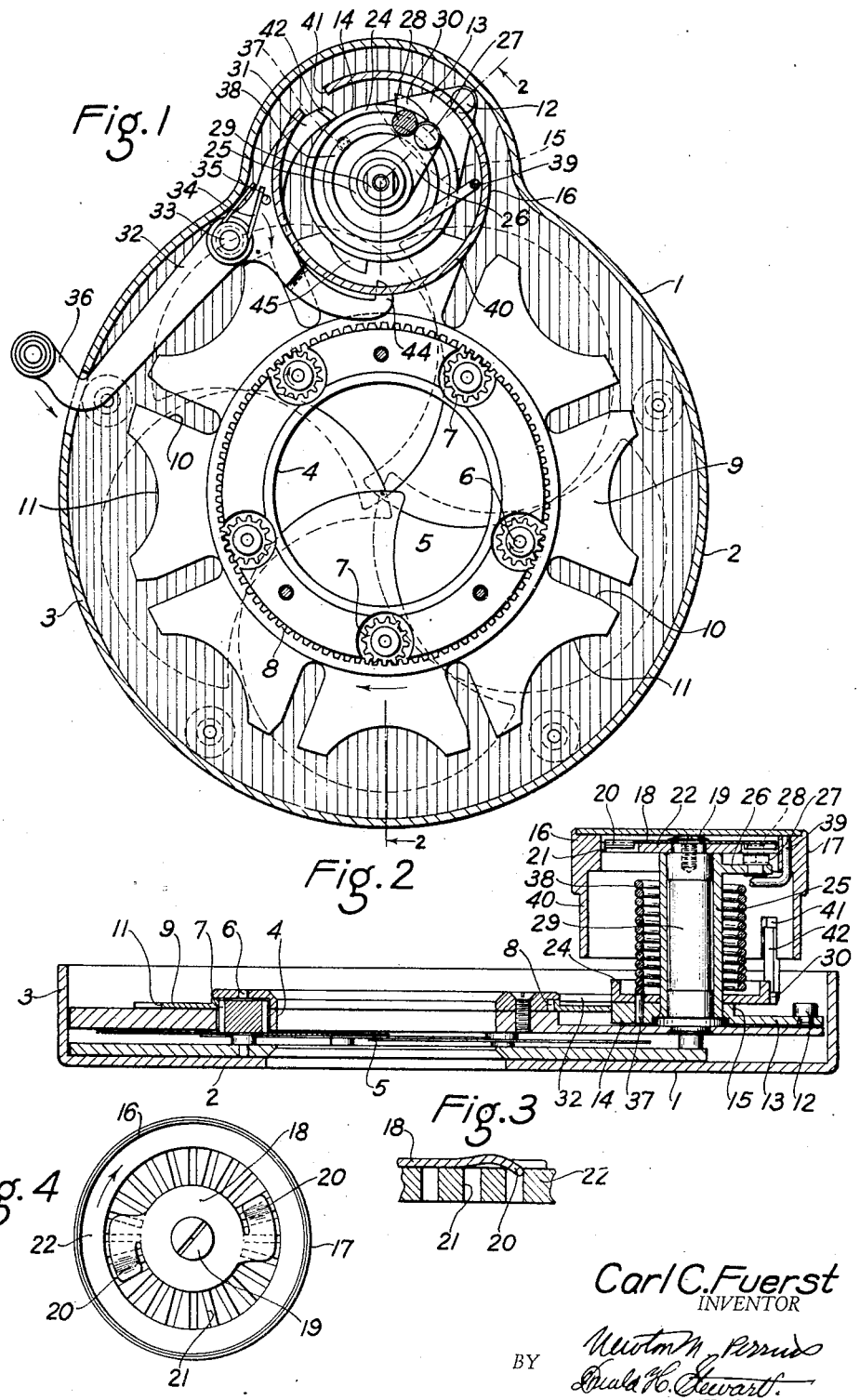

2,327,780

UNITED STATES PATENT OFFICE 2,327,780

CAMERA SHUTTER

Carl C. Fuerst, Rochester, N. Y., assignor to Eastman Kodak Company, Rochester, N. Y., a corporation of New Jersey Application September 6, 1941, Serial No. 409,855

10 Claims. (Cl. 95—63)

This invention relates to photography and, more particularly, to shutters of the between-the-lens type for photographic cameras. One object of my invention is to provide a shutter with which extremely high and accurate speeds may be obtained. Another object of my invention is to provide a shutter which can be easily and quickly set before an exposure is made. Another object of my invention is to provide a shutter in which the trigger is held against operation during the setting movement of the shutter mechanism to prevent the trigger from being accidentally tripped while winding the shutter. Still another object of my invention is to provide a shutter which is simple in construction and which can be readily assembled. Other objects will appear from the following specification, the novel features being particularly pointed out in the claims at the end thereof.

Many attempts have been made to produce a between-the-lens type of shutter in which extremely rapid exposures in the order for instance of 1/1000 of a second could be made where the aperture through which an exposure is made is in the neighborhood of 1½". Because the parts must be moved with extreme rapidity to make such a shutter, it has been difficult to start and stop the movement of the shutter leaves without damaging the shutter leaves and other parts of the shutter mechanism. I have particularly designed my improved shutter to overcome as far as possible the defects of previous shutters by making the parts which must move rapidly in such a way that the prime mover or the master member reaches a high acceleration before the shutter blades are actually moved, and I have particularly designed my improved shutter to prevent the rebound of the suddenly stopping shutter blades which frequently occurs with leaf type shutters used at high speed.

Coming now to the drawings in which like reference characters denote like parts throughout:

Fig. 1 is a plan view, partially in section, of a shutter with the shutter cover removed showing a mechanism in a neutral position, such as it assumes after an exposure has been made;

Fig. 2 is a section taken on line 2—2 of Fig. 1;

Fig. 3 is a fragmentary detail section showing a portion of the film winding ratchet mechanism;

Fig. 4 is a plan view of the ratchet winding mechanism separated from the rest of the shutter;

Fig. 5 is a view similar to Fig. 1, but with the shutter parts shown in the position of releasing the shutter for an exposure;

Fig. 6 is a fragmentary view, otherwise similar to Figs. 1 and 5 with the shutter blades shown in the position they assume after having passed through approximately three-quarters of a revolution in making an exposure; and Fig. 7 is a fragmentary detail view partially in section showing a portion of the shutter with the parts partially wound for making an exposure.

My improved shutter comprises broadly a shutter in which a plurality of shutter leaves are mounted to turn one complete revolution when a torque is applied to them by means of a ring gear and pinion. As thus far described, shutters are known which have a similar construction.

The ring gear which drives the shutter pinions is included in a Geneva driven member which is moved a distance sufficient to rotate each shutter blade pinion, one revolution for each exposure, the ring gear being driven in turn by a Geneva driver which is released so that it may turn through approximately 100° before moving the Geneva driven member, thus acquiring considerable acceleration before the blades are moved.

More specifically my shutter may consist of a support 1, which may form a portion of a shutter casing 2, having an upstanding flange 3 extending around the periphery of the supporting plate and including a central aperture 4 which forms the exposure aperture through which light rays pass in making an exposure. The aperture 4 may be covered by a plurality of similar blades 5 each carried by a shaft 6 affixed to a pinion 7 meshing with the ring gear 8.

The ring gear 8 forms a part of a Geneva driven member 9 which is provided with a plurality of slots 10 and a plurality of curved holding surfaces 11. A Geneva driver 12 is carried on a pivot 13 and is provided with a disk 14 having a cutout portion 15 so shaped that when the periphery of the disk 14 lies against a curved holding surface 11 of the Geneva driven member, the latter will remain stationary until the driver 12 enters a slot 10, at which time the cutout 15 permits the Geneva driven member to be moved in the usual way.

Referring to Fig. 2, it will be noticed that the Geneva driver 12 may be actuated by one end 37 of a spring 38, the other end of which, 39, is anchored in a winding knob 16 preferably serrated at 17 so that, by turning this disk, the spring 38 is tensioned. This structure constitutes the master member.

The post 29 supports a ratchet 18 in a stationary position, the ratchet being attached by a screw 19 as shown in Fig. 4 and having downwardly turned spring arms 20, as shown in Figs. 3 and 4, which arms are adapted to engage any pair of the radial slots 21 which are formed in the disk 22 attached to and forming a part of the knob 16. Thus, the winding knob 16 may only be turned in one direction—in this instance counter-clockwise—in setting the shutter and in tensioning the master member to make an exposure.

When the master member has been set, the parts will come to a stop in the following manner. The Geneva driver includes the plate 24 and the sleeve shaft 25 which carries near the top (Fig. 2) an arm 26 having an upstanding pin 27. This pin is spaced from the sleeve shaft a distance to pass through the same path as a pin 28 carried by the knob 16, the pin 28 forming a stop to prevent the knob 16 from being overturned in winding in the following manner.

The shutter as indicated in Fig. 1 is ready for the winding operation. The winding knob 16 is turned, thereby turning disk 22 and permitting the fixed spring arms 20 to engage different sets of slots 21 as the knob is turned in a counter-clockwise direction. Thus, the knob may be turned a single turn or one or more short turns as desired, since rearward movement is prevented by the ratchet mechanism above described. Continuing the turning movement of the knob causes the parts to pass through the partial wind-up position of Fig. 7 and during this movement the pin 28 passes away from the pin 27 as illustrated, since the Geneva driver 12 is held in the position shown, by means of a lug 30, carried by the Geneva plate 24, coming in contact with the end 31 of a camera trigger 32, this trigger being pivoted upon a stud 33 and pressed by a spring 34 encircling the post 33 and engaging a pin 35 in the direction shown by the arrow, Fig. 5. This movement tends to hold the trigger releasing handle 36 in an outward or operative position. Thus, the end 31 of the trigger holds the lug 30 and with it the Geneva driver 12 against movement until the trigger is released. Continuing the setting movement of the knob, the pin 28 continues to move until it comes to a stop against the pin 27 at which time the shutter is fully set.

To make an exposure the trigger 36 is released as indicated in Fig. 5 and, as soon as this is done, the Geneva driver 12 swings rapidly in a counter-clockwise direction and, after passing through approximately 100° and gaining speed during this movement, it will engage a slot 10 of the Geneva driven member 9 moving it one step. This movement of the Geneva driven member turns the ring gear 8 and with it the pinions 7, the pinions being moved one revolution to cause the shutter blades 5 to move one revolution to make an exposure by opening and closing the aperture 4. This movement is very rapidly accomplished because the master member is permitted to get up the speed before the Geneve driver engages the Geneva driven member to rotate it and the impact thus caused produces a much more rapid exposure than would otherwise be the case.

It is impossible to actuate the trigger 36 while the setting movement—that of turning the knob 16—is taking place. The reason for this is that the knob 16 includes a downwardly extending flange 40 slotted at 41 to permit the passage of an upstanding flange 42 of the trigger. The only time the slot 41 lies opposite the upstanding flange 42 is when the shutter is in a fully wound position, or when it is in a neutral position.

The trigger arm 32 is provided with a second hook-like member 44, the purpose of which is to hold a lug 45 carried by the Geneva driver plate 24 if this should be required.

It is obvious that, if the trigger 36 could be depressed and released rapidly enough, the lug 30 would be all that is necessary to prevent the spring from unwinding. But, it is also obvious that, since an extremely rapid exposure is made, it is quite impossible to rely on the end of the trigger 31 returning to the path of the lug 30 before the exposure is complete. Therefore, a second stop in the form of the hook 44 is provided so that the lug 45 may be caught by the hook 44 if the trigger is depressed and held down during exposure as is customary. When this hook engages the lug 45, the Geneva driver 12 will be in substantially the position shown in Fig. 1 only slightly more in a counter-clockwise position. In this position it will be noticed that the exposure will have been completed. However, if it is possible for an operator to accidentally or otherwise release the trigger 36 so quickly that the hook 44 will not catch the lug 45, then the stop will be formed by the upstanding flange 42, catching the lug 30.

If, as in the usual operation, the hook 44 engages the lug 45 at the completion of an exposure, when the knob 16 is turned in a counter-clockwise direction, pin 28 will permit the Geneva driver 12 to move with it during a short part of the setting movement and until the lug 30 engages the upstanding flange 42. Continued movement, however, causes the pin 28 to revolve until it strikes the opposite side of the pin 27, thus completing the winding movement and bringing the parts into the position shown in Fig. 5, except that the trigger 36 would be in the lug 30 engaging position.

With a shutter built as described above, preliminary tests indicate that an extremely rapid exposure in the order of $\frac{1}{800}$ of a second can be obtained with a comparatively light spring 14 on the master member. The shutter with such a spring is extremely easy to set and it is believed that, with a more powerful spring, a considerably higher speed can be achieved.

The shutter shown is primarily intended for extremely rapid fixed exposures such as are useful for press cameras and sport cameras, and such as are also used for aviation cameras. The parts of my improved shutter are comparatively simple and they can be readily made so that a shutter constructed as above described need not be particularly expensive.

What I claim as new and desire to secure by Letters Patent of the United States is:

1. In a camera shutter including an apertured support, a plurality of pivotally mounted shutter leaves positioned to open and close the aperture to make an exposure, a blade ring, a master member, and connections between the blade ring and shutter leaves for operating the leaves from the blade ring, the combination with said blade ring and said master member, of connections between the blade ring and master member for transmitting motion from the master member to the blade ring including a Geneva driver connection to the master member, and a Geneva driven member connected to the blade ring, a shutter trigger and means carried by the trigger for releasing the Geneva driver to make an exposure.

2. In a camera shutter including an apertured support, a plurality of pivotally mounted shutter leaves positioned to open and close the aperture to make an exposure, a blade ring, a master member, and connections between the blade ring and shutter leaves for operating the leaves from the blade ring, the combination with said blade ring and said master member, of connections between the blade ring and master member for transmitting motion from the master member to the blade ring including a Geneva driver connected to the master member, and a Geneva driven member connected to the blade ring, a shutter trigger, means carried thereby for releasing the Geneva driver to operate the Geneva driven member, and means for limiting the movement of the Geneva driver to approximately one revolution.

3. In a camera shutter including an apertured support, a plurality of pivotally mounted shutter leaves positioned to open and close the aperture to make an exposure, a blade ring, a master member, and connections between the blade ring and shutter leaves for operating the leaves from the blade ring, the combination with said blade ring and said master member, of connections between the blade ring and master member for transmitting motion from the master member to the blade ring including a Geneva driver connected to the master member, and a Geneva driven member connected to the blade ring, a shutter trigger for releasing the Geneva driver, a winding knob for tensioning the master member, and cooperating parts on the winding knob and Geneva driver for limiting movement of the latter to approximately one revolution.

4. In a camera shutter including an apertured support, a plurality of pivotally mounted shutter leaves positioned to open and close the aperture to make an exposure, a blade ring, a master member, and connections between the blade ring and shutter leaves for operating the leaves from the blade ring, the combination with said blade ring and said master member, of connections between the blade ring and master member for transmitting motion from the master member to the blade ring including a Geneva driver connected to the master member, and a Geneva driven member connected to the blade ring, a shutter trigger for releasing the Geneva driver, a winding knob for tensioning the master member, and cooperating pins on the winding knob and Geneva driver movable through the same path to prevent the Geneva driver from turning more than one revolution when released by the trigger.

5. In a camera shutter including an apertured support, a plurality of pivotally mounted shutter leaves positioned to open and close the aperture to make an exposure, a blade ring, a master member, and connections between the blade ring and shutter leaves for operating the leaves from the blade ring, the combination with said blade ring and said master member, of connections between the blade ring and master member for transmitting motion from the master member to the blade ring including a Geneva driver connected to the master member, and a Geneva driven member connected to the blade ring, a shutter trigger for releasing the Geneva driver, a winding knob for tensioning the master member, and cooperating pins on the winding knob and Geneva driver movable through the same path to prevent the Geneva driver from turning more than one revolution when released by the trigger, and a pawl and ratchet between the winding knob and support for permitting movement of the winding knob in one direction only.

6. In a camera shutter including an aperture support, a plurality of pivotally mounted shutter leaves positioned to open and close the aperture to make an exposure, a blade ring, a master member, and connections between the blade ring and shutter leaves for operating the leaves from the blade ring, the combination with said blade ring and said master member, of connections between the blade ring and master member for transmitting motion from the master member to the blade ring including a Geneva driver connected to the master member, and a Geneva driven member connected to the blade ring, a shutter trigger for releasing the Geneva driver, a winding knob for tensioning the master member, and cooperating pins on the winding knob and Geneva driver movable through the same path to prevent the Geneva driver from turning more than one revolution when released by the trigger, a pawl affixed to the support, a radially slotted disk, the slots of which are engaged by said pawl carried by the winding knob, whereby winding of the master member may be accomplished by turning said knob by one turn of approximately 360° or two or more turns of less than 360°.

7. For use on a camera shutter, an apertured support, a plurality of pivotally mounted shutter leaves positioned to open and close the aperture to make an exposure, a blade ring, a master member, and connections between the blade ring and shutter leaves for operating the leaves from the blade ring, the combination with said blade ring and said master member, of connections between the blade ring and master member for transmitting motion from the master member to the blade ring, said master member including a winding knob having an annular flange, a shutter trigger for controlling movement of the master member, and a lug and slot on the trigger and annular flange so positioned that said trigger may only be operated when said lug may pass through said slot.

8. For use on a camera shutter, an apertured support, a plurality of pivotally mounted shutter leaves positioned to open and close the aperture to make an exposure, a blade ring, a master member, and connections between the blade ring and shutter leaves for operating the leaves from the blade ring, the combination with said blade ring and said master member, of connections between the blade ring and master member for transmitting motion from the master member to the blade ring, said master member including a winding knob having an annular flange, a shutter trigger for controlling movement of the master member, and a lug and slot on the trigger and annular flange so positioned that said trigger may only be operated when said lug may pass through said slot, movement of the annular flange for tensioning the master member preventing the lug and slot from registering during the master member tensioning movement.

9. For use on a camera shutter, an apertured support, a plurality of pivotally mounted shutter leaves positioned to open and close the aperture to make an exposure, a blade ring, a master member, and connections between the blade ring and shutter leaves for operating the leaves from the blade ring, the combination with said blade ring and said master member, of connections between the blade ring and master member for transmitting motion from the master member to the blade ring, said master member including a winding knob having a downwardly extending slotted flange, a shutter trigger for releasing the master member, a lug on the trigger positioned to pass through said slotted flange when said winding knob is in a fully wound position, said lug preventing movement of the trigger when said knob is turned in tensioning the master member.

10. A camera shutter including an apertured support, a plurality of blades pivotally mounted thereon, a pinion carried by each blade, a ring gear meshing with said pinions, a master member constituting a source of power, and means for transmitting power from the master member to the ring gear including a Geneva driven member carried by the ring gear and a Geneva driver pivotally mounted and connected to the master member, latch elements carried by the Geneva driver, a trigger including latch elements for holding the Geneva driver in predetermined position, a winding knob for tensioning the master member mounted to turn about the pivotal mount of the Geneva driver, and pins carried by the Geneva driver and master member movable through like paths whereby movement of the Geneva driver and master member may be limited to approximately one revolution through said trigger and Geneva driver latch elements and said pins.

CARL C. FUERST.